Patented May 22, 1945

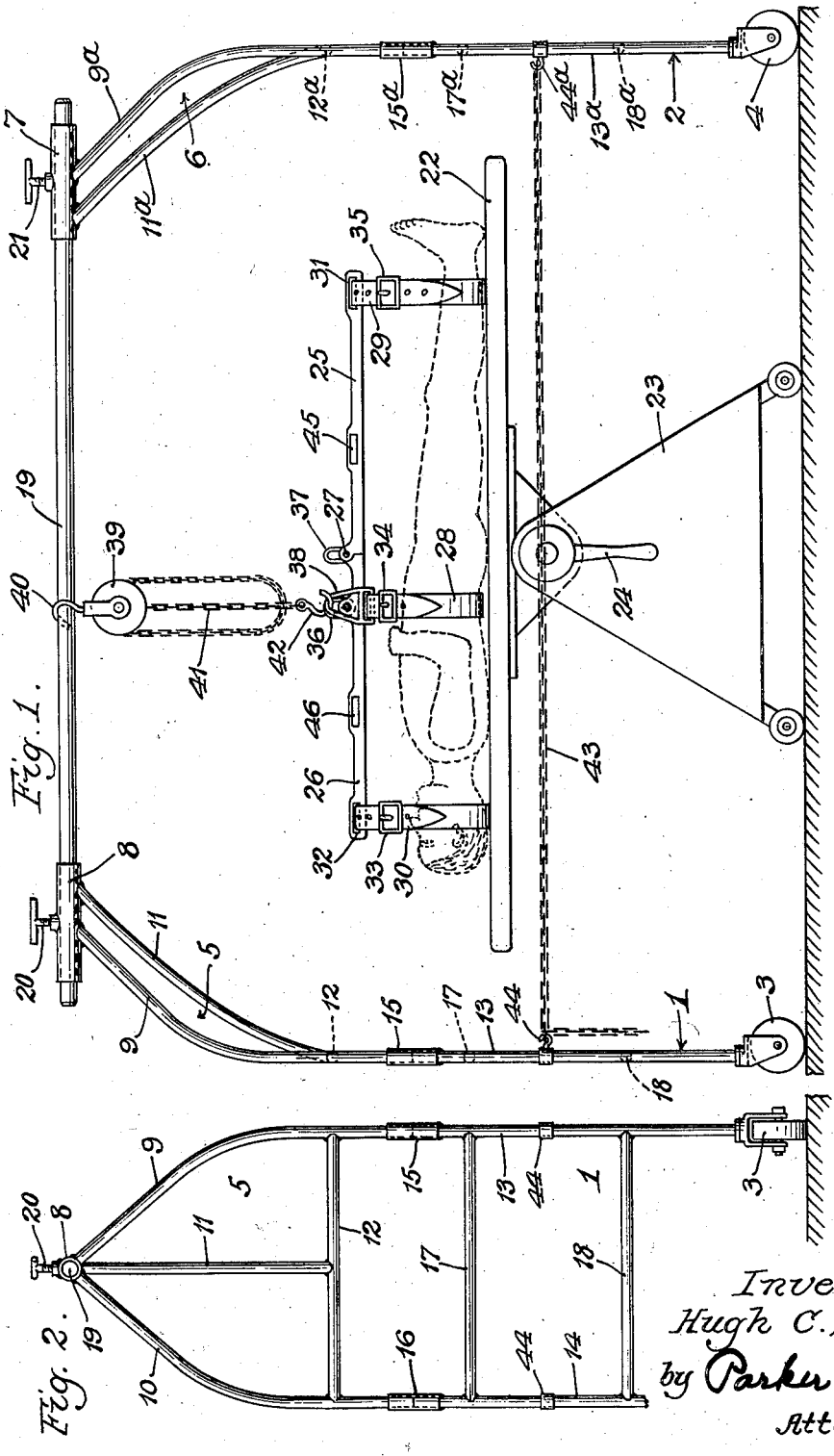

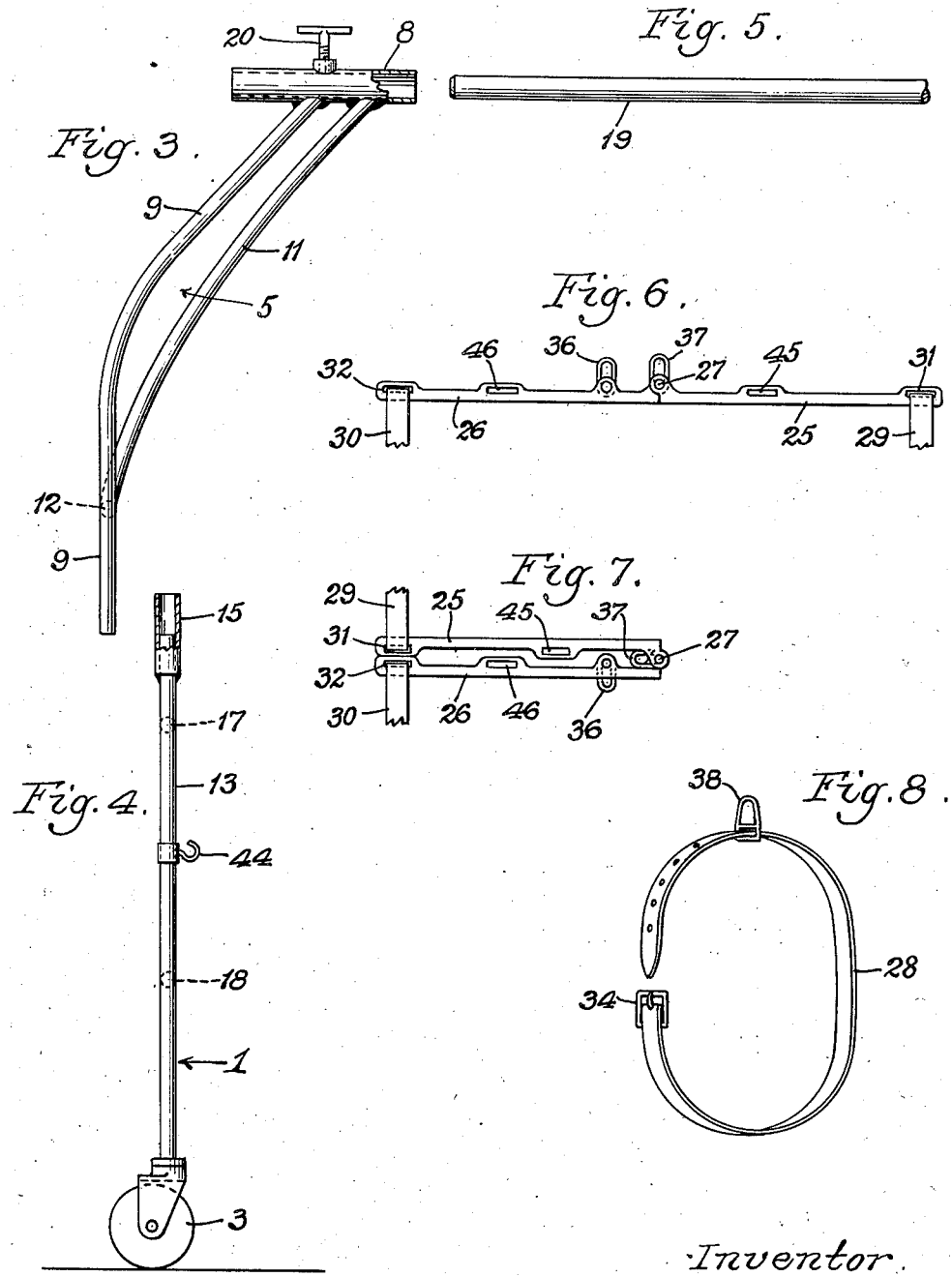

2,376,560

UNITED STATES PATENT OFFICE 2,376,560

BODY HANDLING DEVICE

Hugh C. Smith, Chicago, Ill.

Application April 28, 1941, Serial No. 390,760

3 Claims. (Cl. 248—165)

This invention relates to body handling devices and has for its object to provide a new and improved device of this description.

The invention has as a further object to provide a simple and efficient means for handling human bodies in morgues or undertaking establishments or other places. The invention has as a further object to provide a simple and effective body handling device which can be dismantled to occupy a small amount of space and the parts easily and quickly placed together in their operative positions.

The invention has other objects which are more particularly pointed out in the accompanying description.

Referring now to the drawings,

Fig. 1 is a side elevation of one form of device embodying the invention;

Fig. 2 is an end view of the device shown in Fig. 1;

Fig. 3 is a view showing one of the top end members of the device;

Fig. 4 is a view showing the associated bottom end member of the device;

Fig. 5 is a view showing a portion of the top cross member of the device separated from the end members;

Fig. 6 is a side elevation of the supporting member by means of which the body is lifted and to which the flexible body engaging devices are attached;

Fig. 7 is a side elevation showing the supporting member folded;

Fig. 8 is a perspective view of one of the flexible body engaging devices.

Like numerals refer to like parts throughout the several figures.

The device is particularly adapted for lifting and holding bodies in position for dressing and for laying them in the caskets and for handling caskets and the like. With the means heretofore available it required at least two men to properly handle a body and dress it and get it in the casket. With the present device one man can do this work alone and can do it more easily and quickly and with less intimate contact with the body.

In the construction shown there is a frame device built up of separable sections. There are two bottom end sections 1 and 2 which may be made of rods or hollow pipes, preferably hollow pipes for lightness. These bottom end members are mounted upon suitable rollers 3 and 4. There are two top end members 5 and 6. These top end members have the hollow bar receiving members 7 and 8. Connected with the hollow bar receiving member 8 are the members 9 and 10 which spread out as they project from the hollow bar receiving member 8. There is a central member 11 also connected with the hollow bar receiving member 8 and which is connected to a cross member 12 connecting with the members 9 and 10. Some means is provided for connecting the members 9 and 10 with the members 13 and 14 of the bottom member. As herein shown there are sockets 15 and 16 attached to the members 13 and 14 into which the ends of the members 9 and 10 project with a sufficiently tight fit to hold the parts against accidental removal, see Figs. 1, 2 and 4. The sockets of course may be fastened to the members 9 and 10 and the members 13 and 14 project into them, if desired. There are cross members 17 and 18 connecting the members 13 and 14. The bottom end member and the top end member connected with the hollow bar receiving member 7 have similar members which I have given similar reference numerals with the exponent $a$.

There is a top bar 19 which fits into the hollow bar receiving members 7 and 8. These members are provided with setscrews 20 and 21 so that the bar may be entirely removed or so that the end members may be adjusted toward or away from each other to vary the length of the device.

The body is placed upon a receiving member 22 mounted upon any suitable support, as the support 23. This receiving member is preferably arranged so that it may be tilted by means of the handle 24 and maintained in the tilted position when desired. There is a supporting member for the body consisting of the two parts, 25 and 26, which are attached together at 27, so that they may be folded, as shown in Fig. 7, when not in use. There is a flexible body engaging device 28 which passes under the body and which is located intermediate the head and feet, but nearer the head, so that the body can be balanced on it when lifted from the body receiving member 22. There are end flexible body engaging devices 29 and 30 which pass under the legs near the feet and under the head and which pass through slots 31 and 32 in the supporting member. There are fastening devices 33, 34 and 35 for fastening the ends of these body engaging members so as to hold them in position. The body supporting member is preferably provided with two loops 36 and 37. The loop 37 is centrally located and the loop 36 is eccentrically located, that is, it is between the center of the device and the end, as clearly shown in Fig. 6. When a body is to be lifted, the body engaging member 28 is placed about the body and is provided with a loop 38. A pulley 39 is provided with a hook 40 which is hooked over the bar 19. The end of the chain 41 for this pulley is provided with a hook 42 which is connected with the loop 36 on the supporting member and the loop 38 on the body engaging device, as clearly shown in Fig. 1. This pulley is one of the usual power multiplying devices. By moving the chain 41 the body can be easily lifted from the body receiving member 22 and will be properly balanced so as to maintain a substantially horizontal position. The casket can be put upon the body receiving member 22 and the body then lowered into the casket.

The body receiving member 22 and its support may be entirely removed for the purposes of dressing the body or when desired for other reasons. The entire structure is arranged of the proper size so that it can be pushed endwise through the ordinary door, so as to move it from place to place. In the event it is used in a basement there may be a trapdoor above it through which it may be lifted on to the floor above. When it is desired to move the device any distance by rolling it along the floor, there are preferably provided flexible connecting members 43 which are connected to hooks 44, 44a on the bottom end members, so as to prevent the lower ends of the bottom end members from moving apart. These flexible connecting members are disconnected while the body is being worked with, so as to give free access around the body. The body supporting member is provided with openings 45 and 46. When the device is used to handle other things than bodies, the hook 42 is hooked to the central loop 37. For the handling of shorter devices, the flexible members are passed through the openings 45 and 46, or additional flexible devices may be used in these openings.

The pulley 39 is of the block and tackle type so that when the chain is pulled and then released, the body will be suspended at that point. In other words, by this block and tackle arrangement the body will be completely suspended at any point desired.

When it is desired to dismantle the device so that it will occupy only a small amount of space, the flexible connecting members 43 if in position, are disconnected from the end members. The pulley 39 is disconnected from the bar 19 and from the loops 36 and 38. The parts 25 and 26 of the supporting member are folded over upon each other, as shown in Fig. 7. The loops 36 and 37 are preferably pivoted to the supporting device and when the device is folded, the loop 36 is moved down through a longitudinal slot in the part 26 and the loop 37 is moved down parallel with the two parts 25 and 26, see Fig. 7. The set-screws 20 and 21 are released and the end members slid off of the bar 19. The top end members 5 and 6 are then disconnected from the bottom end members by pulling them out of the sockets. The bottom sections of the end members and the top sections of the end members may then be placed together so as to occupy only a very small amount of space and the bar 19 and the supporting device may then be placed beside them. It will therefore be seen that when the device is disassembled it occupies a very small amount of space and that the parts can be easily and quickly disassembled and easly and quickly assembled.

I claim:

1. A body handling device comprising a frame member comprising two end members, a connecting member for supporting the body, said connecting member connecting the end members together, each end member having two spaced apart side members having their upper portions inclined towards each other, a single hollow tubular member for each end member with which said inclined upper portions are connected, a central member for each end member intermediate the side members and having its upper end connected with said hollow tubular member at a point between the point where the inclined upper portions are connected with the said hollow tubular member and the other end member.

2. A body handling device comprising a frame member comprising two end members, a rigid connecting member for supporting the body, said connecting member connecting the end members together, each end member having two spaced apart side members having their upper portions inclined towards each other, a single hollow tubular member for each end member with which said inclined upper portions are connected, each end member having an intermediate member in a different plane than that of the inclined upper portions of the end member, said intermediate member being connected with said hollow tubular member.

3. A body handling device comprising a frame member comprising two end members, each of said end members having separated supporting members, rollers on the ends of said supporting members, the upper end of each of said end members comprising two spaced apart side members with their upper portions inclined towards each other, a single hollow tubular member for each end member to which the said inclined upper portions of said end members are rigidly connected, a single rigid connecting member for supporting the body and centrally located with relation to the two spaced apart side members, fastening devices for fastening said hollow tubular members to said connecting member at various points therealong, said end members each comprising two separable sections.

HUGH C. SMITH.